United States Patent
Reinders, Jr. et al.

(10) Patent No.: US 7,384,492 B2
(45) Date of Patent: Jun. 10, 2008

(54) METHOD OF FORMING HYBRID AND COMPOSITE TUBULAR FILTERS

(75) Inventors: Richard G. Reinders, Jr., 525 E. Industrial Dr., Hartland, WI (US) 53029; R. Scott Mattson, Milwaukee, WI (US); Oliver Luebker, Pewaukee, WI (US)

(73) Assignee: Richard G. Reinders, Jr., Whitefish Bay, WI (US)

( * ) Notice: Subject to any disclaimer, the term of this patent is extended or adjusted under 35 U.S.C. 154(b) by 512 days.

(21) Appl. No.: 11/191,359

(22) Filed: Jul. 28, 2005

(65) Prior Publication Data
US 2007/0023128 A1     Feb. 1, 2007

(51) Int. Cl.
*B65H 81/00* (2006.01)

(52) U.S. Cl. ............... 156/171; 156/169; 156/173; 156/175

(58) Field of Classification Search ........... 156/169, 156/171, 173, 175
See application file for complete search history.

(56) References Cited

U.S. PATENT DOCUMENTS

| | | | | | |
|---|---|---|---|---|---|
| 2,843,153 | A | * | 7/1958 | Young | 156/175 |
| 3,398,837 | A | * | 8/1968 | Adams | 210/496 |
| 3,692,607 | A | * | 9/1972 | Shobert | 156/175 |
| 4,133,379 | A | * | 1/1979 | Nuzman et al. | 156/175 |
| 4,269,707 | A | * | 5/1981 | Butterworth et al. | 210/503 |
| 4,378,294 | A | * | 3/1983 | Wagner et al. | 156/175 |
| 5,133,864 | A | * | 7/1992 | Vaughn et al. | 210/437 |

* cited by examiner

*Primary Examiner*—Jeff H Aftergut
(74) *Attorney, Agent, or Firm*—Donald J. Ersler

(57) ABSTRACT

The present invention provides a method of forming hybrid and composite filters, which are more durable than that of the prior art. The method of forming a hybrid tubular filter includes wrapping a first layer of fiber, wrapping a filtering material and then wrapping a second layer of fiber. A mandrel is retained in a lathe chuck or the like and an end of fiber is attached to the mandrel. A fiber guide moves parallel to a length of the mandrel according to the direction of a control device. The method of forming a composite tubular filter includes wrapping a first layer of fiber around a mandrel.

15 Claims, 4 Drawing Sheets

METHOD OF FORMING HYBRID AND COMPOSITE TUBULAR FILTERS

BACKGROUND OF THE INVENTION

1. Field of the Invention

The present invention relates generally to tubular filters and more specifically to a method of forming hybrid and composite tubular filters, which are less expensive to manufacture than filters fabricated from other materials.

2. Discussion of the Prior Art

There are numerous water filters in the art. One type of water filter is constructed from a perforated metal tube that is terminated on each end with metal end tubes. A woven wire cloth screen is attached to an inside surface of the perforated metal tube. The manufacture of this water filter is not inexpensive. Further, the woven wire cloth screen may pull away from the inside perimeter of the perforated metal tube.

Accordingly, there is a clearly felt need in the art for a method of forming a hybrid tubular filter, which positively retains a screen and tubular filters, which are more economical to manufacture than that of the prior art.

SUMMARY OF THE INVENTION

The present invention provides a method of forming hybrid and composite tubular filters, which are less expensive to manufacture than filters fabricated from other materials. Tubular filters commonly have a round outer perimeter, but could have a square, rectangular or an outer perimeter with any other appropriate shape. The method of forming a hybrid tubular filter includes wrapping a first layer of fiber, wrapping a filtering material and finally wrapping a second layer of fiber. The fiber or tow includes a plurality of filaments and a binder. Additional binder may be added to the fiber in a second operation. A mandrel is retained in a rotary chuck or the like. An end of the fiber is attached to the mandrel. A fiber guide moves the fiber back and forth, parallel to an axis of the mandrel according to the direction of a programmable controller. If additional binder is required, the fiber is run across a binder cylinder. The binder cylinder is rotated to collect binder contained in a bath. The binder adheres to the fiber as thereof moves across the binder cylinder. If no additional binder is required, the fiber may be run through a heating device, which heats the binder contained in the fiber. However, preheating the fiber is not always required. The fiber guide moves the fiber back and forth along a length of the mandrel, until a predetermined amount of fiber is applied to the mandrel.

The programmable controller stops the rotation of the mandrel, after the first layer of fiber is wrapped around the mandrel. The fiber is oriented to be at one end of the mandrel. Preferably, a filtering material is temporarily retained around the first layer of fiber. A second layer of fiber is slowly wrapped around the filtering material, until the flat filtering material is secured around the first layer of fiber. The second layer of fiber is then applied at a normal speed, until a predetermined amount of fiber is applied over the filtering material. The end diameters of the hybrid tubular filter may be increased by winding thereof with additional fiber. The end diameters may be further modified by machining thereof to fit the inner diameter of a filter housing or the like. The end diameters may be machined by grinding, turning or any other suitable process.

The method of forming a composite tubular filter includes wrapping a first layer of fiber around a mandrel. An end of the fiber is attached to the mandrel. A fiber guide moves the fiber parallel to an axis of the mandrel according to the direction of a programmable controller. If the fiber requires additional binder, then the filament collects binder retained on the binder cylinder. If the fiber does not require additional binder, the fiber may be run through a heating device. The fiber guide moves the fiber back and forth along a length of the mandrel, until a predetermined thickness of fiber is applied to the mandrel. The end diameters of the composite tubular filter may be increased by winding with additional fiber. The end diameters may be further modified by machining thereof to fit the inner diameter of a filter housing or the like.

Accordingly, it is an object of the present invention to provide a hybrid tubular filter, which positively retains a filtering material.

It is a further object of the present invention to provide a composite tubular filter, which does not corrode in a fluid.

Finally, it is another object of the present invention to provide tubular filters, which are more economical to manufacture than that of the prior art.

These and additional objects, advantages, features and benefits of the present invention will become apparent from the following specification.

DETAILED DESCRIPTION OF THE PREFERRED EMBODIMENTS

Figure 1:
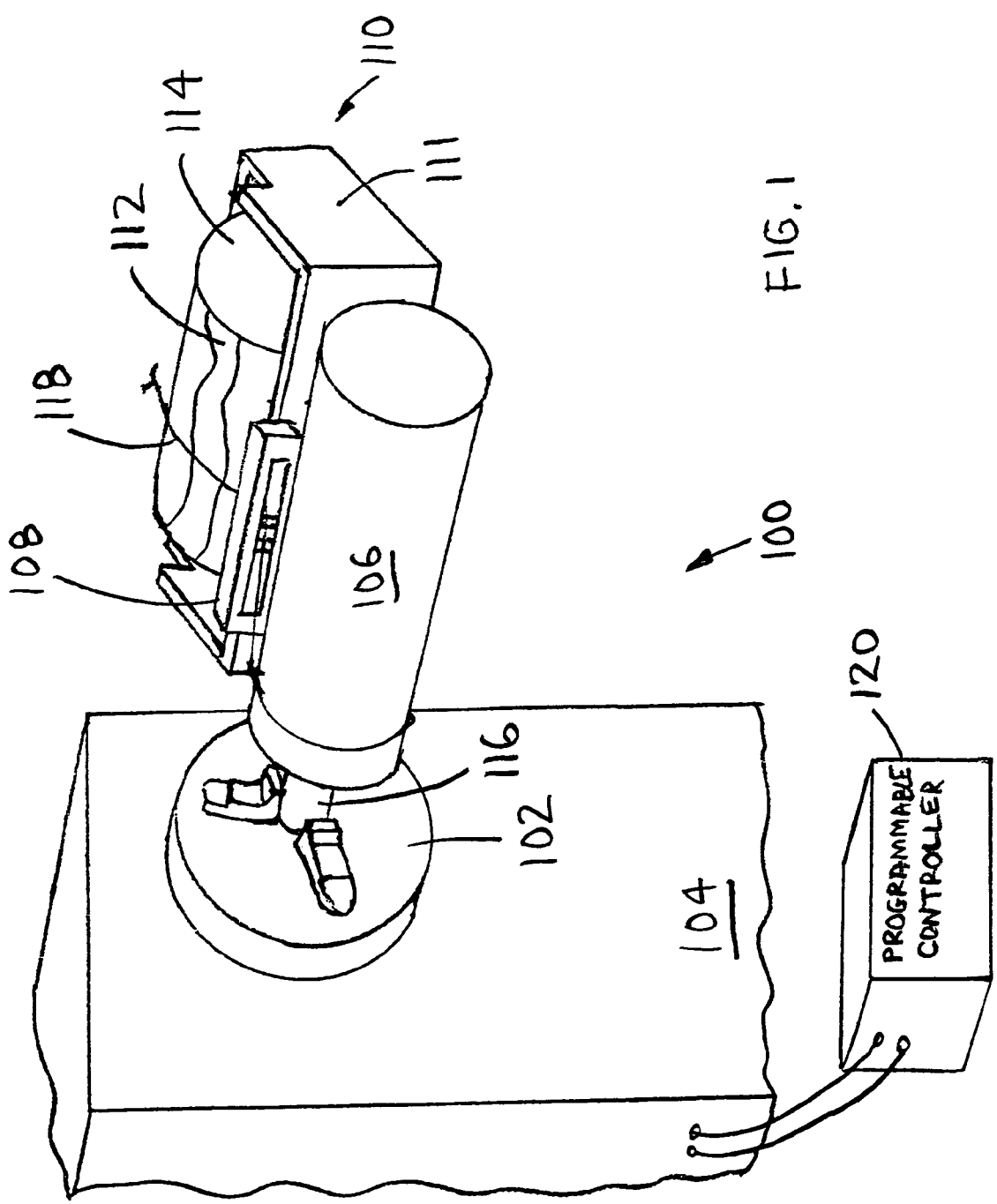
FIG. 1 is a perspective view of a portion of a fiber winding apparatus utilizing a binder bath in accordance with the present invention.
Figure 1A:
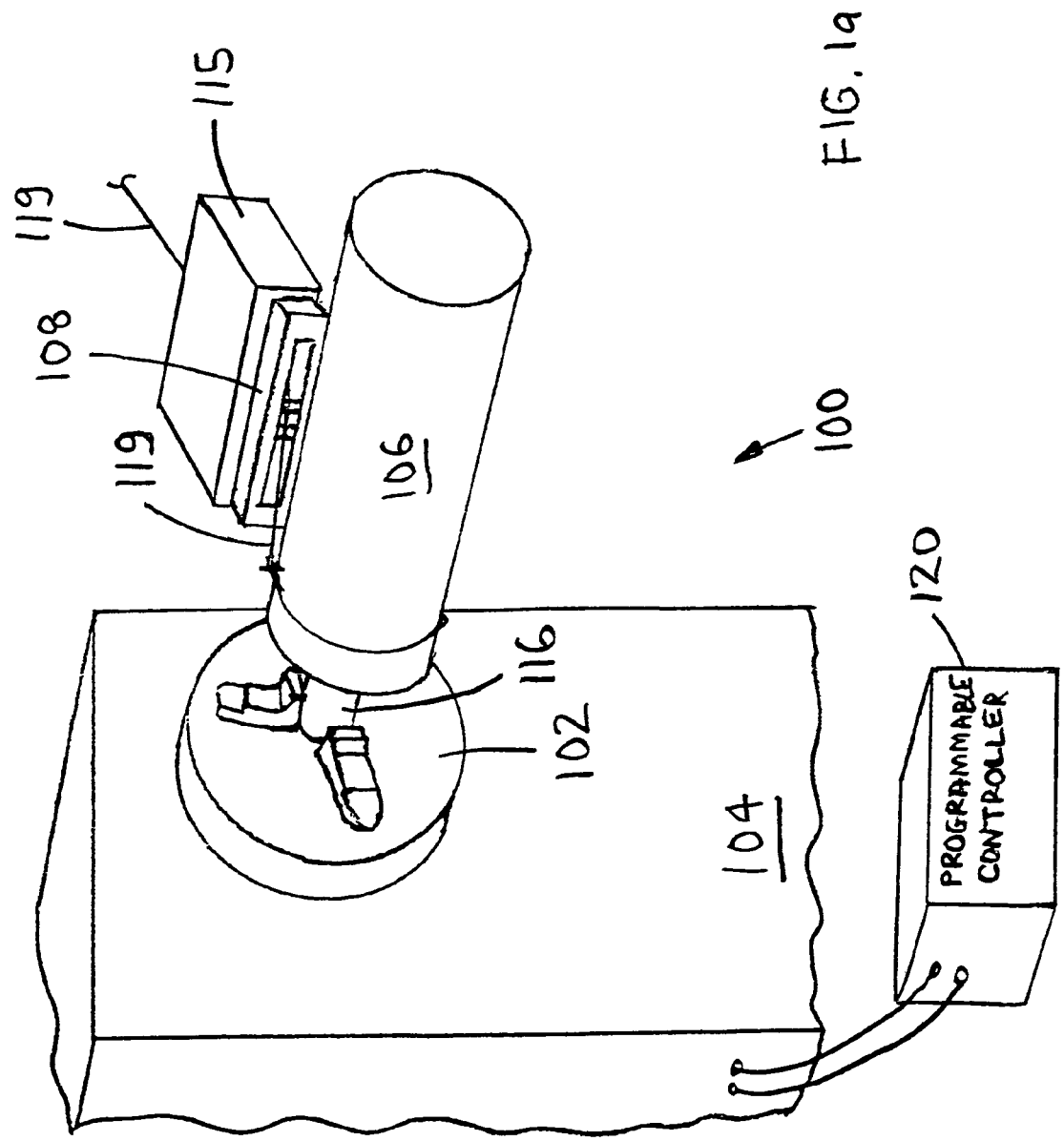
FIG. 1*a* is a perspective view of a portion of a fiber winding apparatus utilizing a heater device in accordance with the present invention.

With reference now to the drawings, and particularly to FIG. 1, there is shown a perspective view of a portion of a fiber winding apparatus 100. The fiber winding apparatus 100 preferably includes a rotary chuck 102, a drive source 104, a mandrel 106 and a fiber guide 108. However, other devices may be used to wrap fiber around a mandrel. If additional binder is applied to the fiber, the fiber is run through a binder bath (resin bath) 110. The binder bath 110 includes a bath container 111, a quantity of binder 112 and a binder cylinder 114. With reference to FIG. 1a, if additional binder 112 is not applied to a fiber, then a heating device 115 may be used to heat the binder contained in the fiber 119. However, preheating the fiber 119 is not always required. A tubular filter fabricated from a fiber without additional binder added thereto typically has to be heated in a secondary operation. The secondary heating operation is well known in the art and need not be explained in further detail.

Many different filament materials and binders exist in the art. For example, fibers that may or may not require additional binder include filaments of Kevlar, carbon or fiberglass. A fiber having polypropylene filaments, does not have to have additional binder applied thereto. However, the fiber having polypropylene filaments may be preheated in the heating device 115. The appropriate fiber is dependent upon the application for the tubular filter.

A projection end 116 of the mandrel 106 is retained in the rotary chuck 102 or the like. A longer mandrel 106 will require support on both ends. The rotary chuck 102 is rotated by the drive source 104. An end of a piece of fiber 118, 119 is attached to the mandrel 106. The fiber guide 108 is retained adjacent the mandrel 106. If additional binder 112 is applied to the fiber 118, the binder cylinder 114 is rotated relative to the bath container 111, such that the linear velocity of the fiber 118 is equal to the velocity of the outer diameter of the binder cylinder 114. The rotation of the binder cylinder 114 collects binder 112 on the outer diameter from a bottom of the bath container 111. The binder 112 adheres to the fiber 118 as thereof moves across the outer diameter of the resin cylinder 114. The fiber guide 108 is moved back and forth relative to an axial length of the mandrel 106, until a predetermined amount of fiber 118, 119 is applied to the mandrel 106. Fiber winding apparatuses are well known in the art and need not be explained in further detail.

With reference to FIGS. 2-6, a method of forming a hybrid tubular filter 1 includes wrapping a first layer of fiber 10, wrapping a filtering material 12 and finally wrapping a second layer of fiber 14. After an end of the fiber 118, 119 has been secured to the mandrel 106, the fiber guide 108 is moved back and forth along the length of the rotating mandrel 106 to produce an open helical pattern of the first layer of composite material 10 with a particular thickness. The creation of the open helical pattern of the first layer 10 is not offered by a programmable controller used with the fiber winding apparatus machine 100 or any other fiber winding machine. The programmable controller 120 can be characterized as a control device. Other control devices besides the programmable controller 120 may be used, such as a changeable gear drive.

The open helical pattern is created by choosing a fiber width that is narrower than that entered into the programmable controller 120. The programmable controller 120 uses a width of fiber that will normally produce a solid cylinder. However, in creation of a filter, there must be a plurality first openings 16 formed through the first layer of fiber 10 to allow the flow of fluid therethrough. The narrower fiber width creates the plurality of first openings 16. The following parameter is given by way of example and not by way of limitation. Satisfactory results have been found by using a width of fiber that is 20% of that entered into the programmable controller 120. However, other percentages may also be used. The greater the percentage the smaller the openings. The plurality of first openings 16 allow fluid to flow through the filtering material 12.

Figure 3:
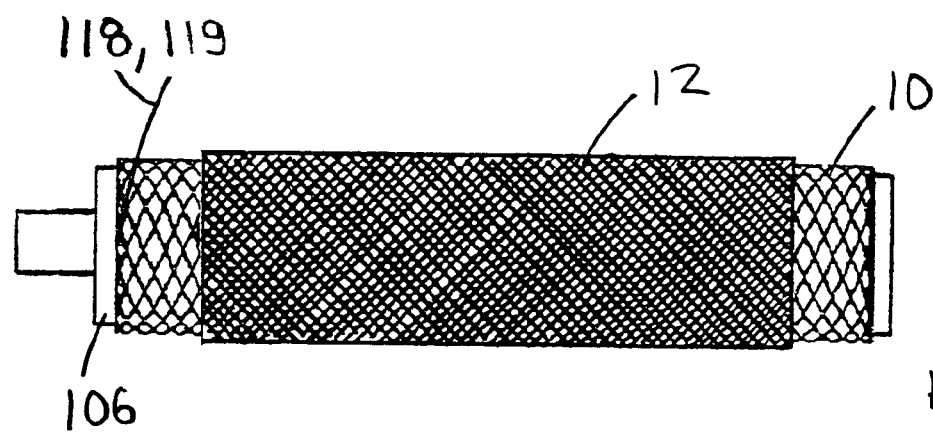
FIG. 3 is a side view of a filtering material secured around a first layer of fiber of a hybrid tubular filter in accordance with the present invention.
Figure 4:
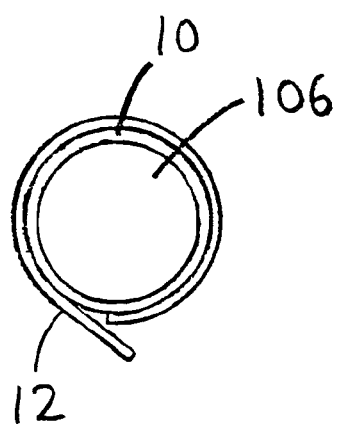
FIG. 4 is an end view of a filtering material partially wrapped around a first layer of fiber of a hybrid tubular filter in accordance with the present invention.
Figure 5:
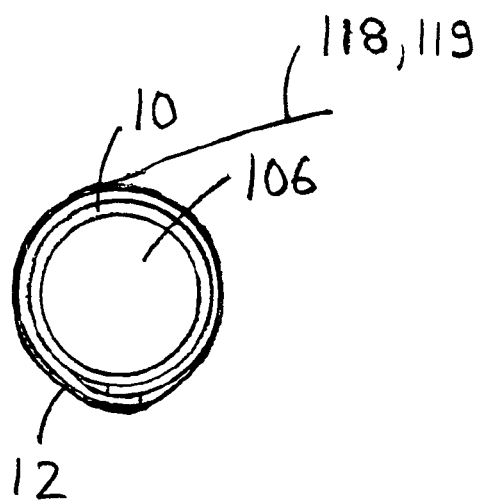
FIG. 5 is an end view of a filtering material fully wrapped around a first layer of fiber of a hybrid tubular filter in accordance with the present invention.
Figure 6:
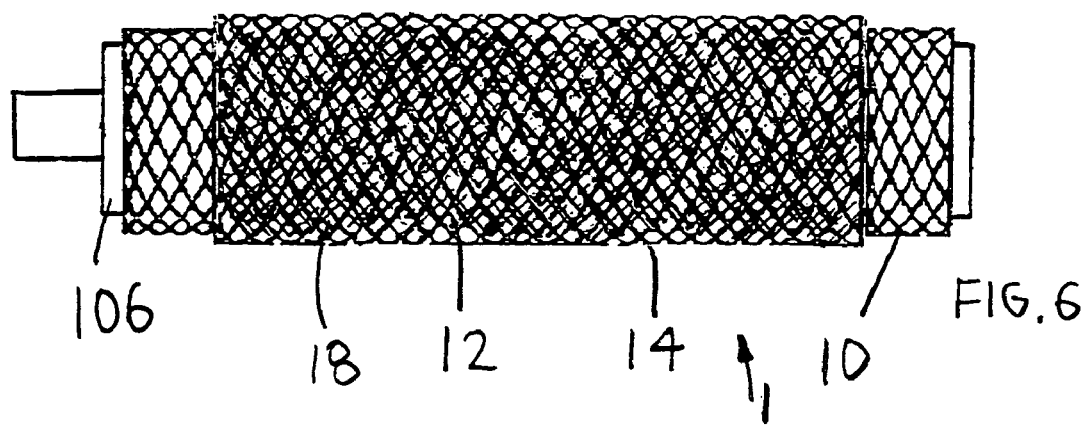
FIG. 6 is a side view of a second layer of fiber wrapped around a filtering material of a hybrid tubular filter in accordance with the present invention.

The programmable controller 120 stops the rotation of the mandrel 106, after the first layer of fiber 10 is wrapped around the mandrel 106. With reference to FIG. 3, the composite fiber 118, 119 is oriented to be at one end of the mandrel 106. Preferably, the filtering material 12 is temporarily retained around the first layer of fiber 10. The filtering material 12 may be held in place by hand, attached with glue, attached with adhesive or through any other suitable method. The filtering material 12 is preferably a woven wire cloth screen or a membrane sheet, but other filtering elements may also be used. The fiber 118 is slowly wrapped around the filtering material 12, until the filtering material 12 is secured around the first layer of fiber 10.

The second layer of fiber 14 is then wrapped at a normal speed, until a predetermined amount of fiber 118, 119 is wrapped around the flat filtering material 12. The second layer of fiber 14 also includes the open helical pattern that creates a plurality of second openings 18. Fluid flows from an inside perimeter of the hybrid tubular filter 1 to an outside perimeter by flowing through the plurality of first openings 16, the filtering material 12 and the plurality of second openings 18. Fluid may also flow from an outside perimeter of the hybrid tubular filter 1 to an inside perimeter thereof.

Figure 7:
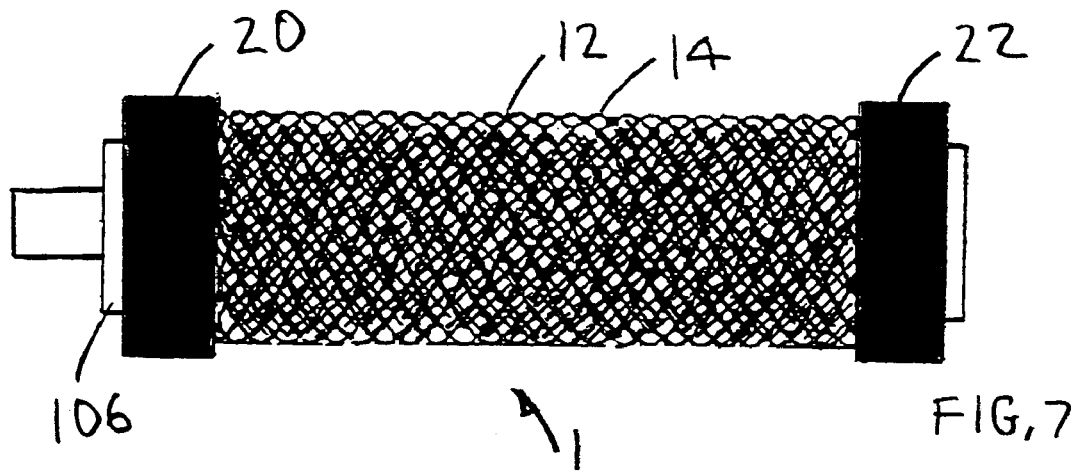
FIG. 7 is a side view of a hybrid tubular filter having ends that have been increased in diameter in accordance with the present invention.
Figure 8:
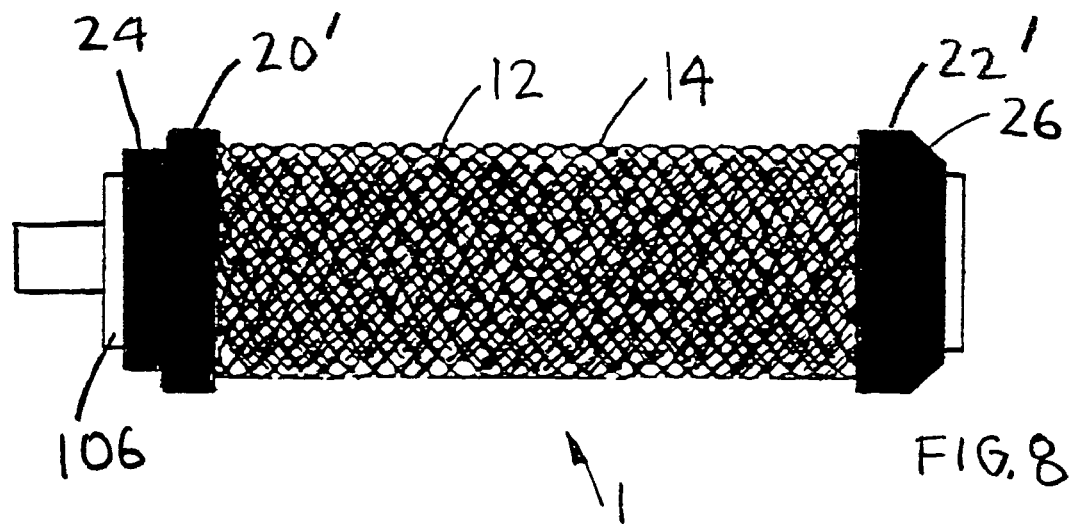
FIG. 8 is a side view of a hybrid tubular filter having ends that have been machined to fit an inner diameter of a housing or the like in accordance with the present invention.

With reference to FIG. 7, a magnitude of a first end diameter 20 and a second end diameter 22 of the hybrid tubular filter 1 may be increased by winding with additional fiber. With reference to FIG. 8, the first and second end diameters may be further modified by machining thereof to fit the inner diameter of a filter housing or the like. A reduced diameter 24 is formed on the first end diameter 20' and a chamfer 26 is formed on the second end diameter 22'. The first and second end diameters may be machined by grinding, turning or any other suitable process.

Figure 2:
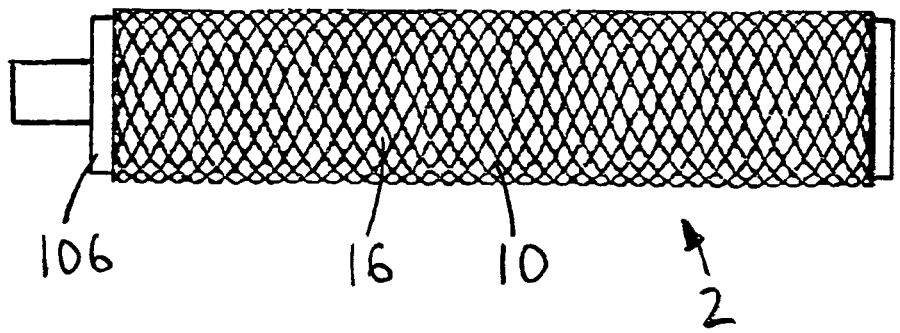
FIG. 2 is a side view of a first layer of fiber of a hybrid or composite tubular filter in accordance with the present invention.

With reference to FIG. 2, the method of forming a composite tubular filter 2 includes wrapping a first layer of fiber 10 around the mandrel 106. An end piece of the fiber 118, 119 is attached to the mandrel 106. The fiber guide 108 moves the fiber 118, 119 back and forth along a length of the mandrel 106 according to the direction of the programmable controller 120 to apply a predetermined thickness of the fiber 118, 119. The thickness of the first layer of fiber 10 for the composite tubular filter 2 must be greater than that of the hybrid tubular filter 1, because of the single layer of fiber.

The open helical pattern created for the hybrid tubular filter 1 is also created in the composite tubular filter 2 to produce the plurality of first openings 16 to allow the flow of fluid therethrough. A narrower fiber width than that entered into the programmable controller 120 creates the plurality of first openings 16. A fiber width of 20% of that entered into the programmable controller may be used or a different percentage may be used to accommodate different filtering requirements. The greater the percentage, the smaller the openings. The end diameters of the composite tubular filter 2 may be increased by winding additional fibers thereupon as shown in FIG. 7. The end diameters may be further modified by machining thereof to fit the inner diameter of a filter housing or the like as shown in FIG. 8.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of creating a hybrid tubular filter, comprising the steps of:
   securing an end of a continuous fiber to a mandrel, said continuous fiber being run through a binder bath before wrapping around said mandrel;
   moving said continuous fiber relative to a length of said mandrel during rotation to create an open helical pattern, said open helical pattern including a plurality of openings;
   applying a filtering material to said open helical pattern, said filtering material being a flat sheet; and
   wrapping said continuous fiber around said filtering material in a second open helical pattern to form a second plurality of openings, said continuous fiber remaining continuous from said open helical pattern to said second open helical pattern.

2. The method of creating a composite tubular filter of claim 1, further comprising the step of:
   heating said fiber with a heating device.

3. The method of creating a hybrid tubular filter of claim 1, further comprising the steps of:
   providing a wire woven cloth screen for said filtering material.

4. The method of creating a hybrid tubular filter of claim 1, further comprising the steps of:
   providing a fiber winding apparatus for wrapping said fiber around said mandrel, said fiber winding apparatus including a control device, providing said fiber with a width that is a fraction of the actual width entered into said control device.

5. The method of creating a hybrid tubular filter of claim 1, further comprising the steps of:
   wrapping said fiber around at least one end of said composite tubular filter to increase an outer diameter of an end diameter.

6. The method of creating a hybrid tubular filter of claim 5, further comprising the steps of:
   removing material from said end diameter.

7. A method of creating a hybrid tubular filter, comprising the steps of:
   securing an end of a continuous fiber to a mandrel, said continuous fiber being run through a binder bath before wrapping around said mandrel;
   moving said continuous fiber relative to a length of said mandrel during rotation to create an open helical pattern, said open helical pattern including a plurality of openings;
   applying a filtering material to said open helical pattern, said filtering material being a flat sheet;
   wrapping said continuous fiber around said filtering material in a second open helical pattern to form a second plurality of openings, said continuous fiber remaining continuous from said open helical pattern to said second open helical pattern; and
   wrapping said continuous fiber around at least one end of said composite tubular filter to increase an outer diameter of an end diameter.

8. The method of creating a composite tubular filter of claim 7, further comprising the step of:
   heating said fiber with a heating device.

9. The method of creating a hybrid tubular filter of claim 7, further comprising the steps of:
   providing a programmable controller for said control device.

10. A method of creating a hybrid tubular filter, comprising the steps of:
    securing an end of a fiber to a mandrel, said fiber being run through a binder bath before wrapping around said mandrel;
    moving said fiber relative to a length of said mandrel during rotation to create an open helical pattern, said open helical pattern including a plurality of openings;
    applying a filtering material to said open helical pattern, said filtering material being a flat sheet; and
    wrapping said fiber around said filtering material in a second open helical pattern to form a second plurality of openings with said fiber; and
    wrapping said fiber around each end of said composite tubular filter to increase an outer diameter of an end diameter.

11. The method of creating a composite tubular filter of claim 10, further comprising the step of:
    heating said fiber with a heating device.

12. The method of creating a hybrid tubular filter of claim 10, further comprising the steps of:
    providing a wire woven cloth screen for said filtering material.

13. The method of creating a hybrid tubular filter of claim 10, further comprising the steps of:
    providing a fiber winding apparatus for wrapping said fiber around said mandrel, said fiber winding apparatus including a control device, providing said fiber with a width that is a fraction of the actual width entered into said control device.

14. The method of creating a hybrid tubular filter of claim 10, further comprising the steps of:
    wrapping said fiber around at least one end of said composite tubular filter to increase an outer diameter of an end diameter.

15. The method of creating a hybrid tubular filter of claim 10, further comprising the steps of:
    removing material from said end diameter.

* * * * *